W. S. HOW.
TOOLS AND TOOL-HOLDERS.
No. 185,105. Patented Dec. 5, 1876.
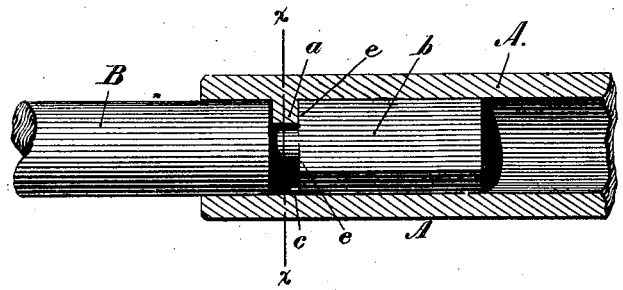
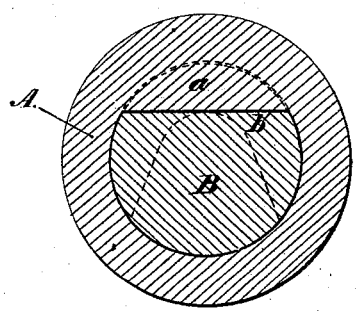
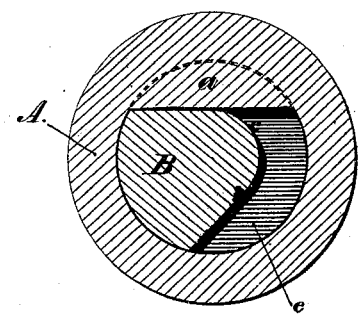
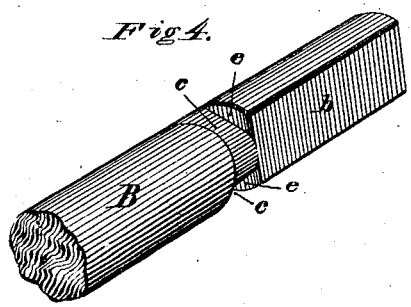
WITNESSES
Harry King
H. H. Young
W. Storer How.
INVENTOR
By his Attorney
Wm D. Baldwin

UNITED STATES PATENT OFFICE.

WOODBURY S. HOW, OF CINCINNATI, OHIO, ASSIGNOR TO SAMUEL S. WHITE, OF PHILADELPHIA, PENNSYLVANIA.

IMPROVEMENT IN TOOLS AND TOOL-HOLDERS.

Specification forming part of Letters Patent No. 185,105, dated December 5, 1876; application filed February 18, 1875.

*To all whom it may concern:*

Be it known that I, WOODBURY STORER HOW, of Cincinnati, in the county of Hamilton and State of Ohio, have invented certain new and useful Improvements in Machine-Tools and Tool-Holders, of which I declare the following to be a full, clear, and exact description, reference being had to the accompanying drawings, making a part of this specification, and in which—

Figure 1 represents a longitudinal central section through so much of a tool-holder having a tool-shank inserted therein as is necessary to illustrate the invention herein claimed. Fig. 2 represents a transverse section through the instrument, showing its locking-lug and groove in the positions they relatively occupy when the tool is first inserted in the socket. Fig. 3 shows a similar view with the shank locked in the holder; and Fig. 4, a view, in perspective, of the tool-shank.

My invention relates to that class of instruments—such as drills, slotters, burrs, and other lathe-tools—which are inserted in a rotating socket, chuck, or tool-holder, and which require frequent and rapid insertion or removal. Its object is, while permitting of such manipulations, to hold the tool securely locked in its socket against pulling strains when rotated in either direction, while dispensing with holding-springs or yielding catches; to which end my improvement consists in constructing the tool-shank with at least one flattened side, and with a transverse groove, so that the flattened ends of the shank may be inserted in the end of the socket until its groove comes opposite a lug or pin tangential to the bore of the tool-holder, which is interlocked with the groove by a partial rotation of the tool-shank, thus holding the tool firmly in position.

In order to carry out my invention, a lug, rib, or pin, $a$, is arranged tangentially in the bore of a chuck or tool-holder, A. The shank B of the tool has one of its sides flattened or cut away, as at $b$, so as to enable the shank to pass the lug $a$ in the socket, the rounded portion of the shank forming a shoulder or stop, which regulates the depth to which the tool-shank is inserted in said socket. The transverse groove $c$, corresponding in depth with the lug or rib $a$, is cut in the tool-shank between the shoulder above mentioned and the flattened part of the tool.

When the shank is inserted to its proper depth in the socket the transverse groove comes opposite the lug or rib above mentioned, and permits the shank to be turned about a quarter-turn in either direction desired, thus carrying one of the shoulders $e$ behind the rib, and locking the shank and rib securely together.

It is obvious that by making the transverse slot of a tapering or wedge-shaped form a griping action will be exerted upon the rib; or a slight screw-pitch might be given to the rib as well as the groove.

It will be observed that by my improvement the tool is supported entirely by the revolving chuck or mandrel, instead of having additional bearings in a supporting-sleeve or hand-piece, such as is employed in dental engines, and the friction and strain upon the extra bearings in the hand-piece are thus obviated.

I claim as my invention—

1. The tool constructed, substantially as described, with a flattened end and transverse groove between the round and the flattened portions of the tool, for the purposes specified.

2. In combination, a socket or rotating tool-holder having a locking-lug tangential to the bore thereof, a tool having a flattened shank, and a transverse locking-groove on the shank of the tool, between the flattened end and round part thereof, these members being constructed and operating substantially as described, whereby the shank of the tool is locked in the socket in whichever direction it may be rotated.

In testimony whereof I have hereunto subscribed my name.

WOODBURY STORER HOW.

Witnesses:
 WM. S. BATES,
 DANIEL S. J. KELLY.